United States Patent
Akyol et al.

(10) Patent No.: US 6,762,999 B2
(45) Date of Patent: *Jul. 13, 2004

(54) SCALABLE AND FAULT-TOLERANT LINK STATE ROUTING PROTOCOL FOR PACKET-SWITCHED NETWORKS

(75) Inventors: Bora Akyol, San Jose, CA (US); Puneet Agarwal, San Francisco, CA (US); Les Ginsberg, Cupertino, CA (US)

(73) Assignee: Pluris, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/219,565

(22) Filed: Aug. 14, 2002

(65) Prior Publication Data

US 2002/0191547 A1 Dec. 19, 2002

Related U.S. Application Data

(63) Continuation of application No. 09/727,907, filed on Nov. 30, 2000, now Pat. No. 6,529,481.

(51) Int. Cl.$^7$ .............................. H04L 12/26; H04J 3/14; G06F 11/00; G08C 15/00
(52) U.S. Cl. ...................... 370/250; 370/238; 370/396; 370/401; 709/239; 709/243
(58) Field of Search ................................ 370/238, 250, 370/254, 394, 396, 401, 404, 409, 465, 216, 217, 220–228, 351, 366, 392, 398, 466; 709/239, 243, 244; 340/825, 826, 827

(56) References Cited

U.S. PATENT DOCUMENTS

| | | | | |
|---|---|---|---|---|
| 5,265,092 A | * | 11/1993 | Soloway et al. | 370/238 |
| 5,361,256 A | * | 11/1994 | Doeringer et al. | 370/390 |
| 5,524,254 A | * | 6/1996 | Morgan et al. | 395/800 |
| 5,790,546 A | * | 8/1998 | Dobbins et al. | 370/400 |
| 5,987,521 A | * | 11/1999 | Arrowood et al. | 709/239 |
| 6,049,524 A | * | 4/2000 | Fukishima et al. | 370/220 |
| 6,069,895 A | * | 5/2000 | Ayandeh | 370/399 |
| 6,252,878 B1 | * | 6/2001 | Locklear, Jr. et al. | 370/401 |
| 6,275,492 B1 | * | 8/2001 | Zhang | 370/392 |
| 6,529,481 B2 | * | 3/2003 | Akyol et al. | 370/250 |

OTHER PUBLICATIONS

U.S. patent application Ser. No. 09/727,907, Akyol et al.

* cited by examiner

*Primary Examiner*—Man Phan
(74) *Attorney, Agent, or Firm*—Donald R. Boys; Central Coast Patent Agency, Inc.

(57) ABSTRACT

A distributed Link-State Routing Protocol (LSRP) system in a packet switch having external communication ports has a first card executing Update process of the LSRP, making database updates, a second card executing Decision process (Shortest Path First (SPF)) of the LSRP, and a communication fabric coupling the cards with each other and the external ports. The LSRP may be an IS—IS system. In some embodiments there are additional cards involved, and the distribution of Link-State functions is over a set of multiple cards. Also in some embodiments there is a Location Service (LS) controller monitoring and configuring cards in the system.

16 Claims, 5 Drawing Sheets

| State | IS IS Process Description |
|---|---|
| Active/SPF | Update process in the active role<br>Decision process in the active role |
| Active// | Update process in the active role |
| Backup/SPF | Update process in the backup role<br>Decision process in the active role |
| Backup// | Update process in the backup role |
| //SPF | Decision process in the active role |
| /// | No IS-IS processing |

| State | IS IS Process Description |
|---|---|
| Active/SPF | Update process in the active role<br>Decision process in the active role |
| Active// | Update process in the active role |
| Backup/SPF | Update process in the backup role<br>Decision process in the active role |
| Backup// | Update process in the backup role |
| //SPF | Decision process in the active role |
| /// | No IS-IS processing |

*Fig. 2*

SCALABLE AND FAULT-TOLERANT LINK STATE ROUTING PROTOCOL FOR PACKET-SWITCHED NETWORKS

The present invention is a continuation application of prior co-pending application Ser. No. 09/727,907 filed on Nov. 30, 2000, which has matured into U.S. Pat. No. 6,529,481. The priority Patent is incorporated herein in its entirety by reference.

FIELD OF THE INVENTION

The present invention is in the area of packet routers for use with wide-area packet networks, such as the Internet, and pertains more particularly to Link State Routing Protocol(LSRP) for such routers and networks.

BACKGROUND OF THE INVENTION

At the time of the present patent application demand for increased data capacity and efficiency in Internet traffic continues to increase dramatically as more individuals and businesses increase their use of the Internet. The ever-increasing demand also drives development of equipment for the Internet such as data packet routers. A number of enterprises are developing routers that are capable of faster and higher capacity handling of data packets.

The Internet, operating globally, comprises components from a wide variety of companies and organizations. It is, of course, necessary that such equipment conform to certain hardware and connection standards and operate by certain data transfer standards and protocols. These standards are all well known to the skilled artisan.

As new and better equipment for routing data traffic in the Internet continues to be developed, researchers developing such equipment are including fault tolerance, diagnostic capabilities, and redundancy into the equipment, links between instances of routing equipment, and in routing protocols One of the important developments in Internet technology as of the time of filing of the present patent application is in development of faster, and scalable routers. The present inventors, for example, are involved in development of what are known in the art as Terabit routers, capable of much higher packet transfer rates than currently available in the art. These routers are scalable to higher and higher overall data transfer rates, by allowing upwards of seven thousand interfaces to network traffic.

As the number of interfaces to network traffic grows, the importance of scalability and fault-tolerance grows apace. What is clearly needed is a method for making link-state routing protocols both scalable and fault tolerant.

SUMMARY OF THE INVENTION

In a preferred embodiment a distributed Link-State Routing Protocol (LSRP) system in a packet switch having external communication ports is provided, comprising a first card executing an update process of the LSRP, making database updates, a second card executing Decision (Shortest Path First (SPF)) process of the LSRP, and a communication fabric coupling the cards with each other and the external ports. In some embodiments the LSRP is one of an Intermediate System to Intermediate System (IS—IS) LSRP, and in others an Open Shortest Path First (OSPF) LSRP. Also in some embodiments there may be a third card communicating through the fabric with the first and second cards and the ports, wherein the first card updates both the second and third cards, maintaining synchronized copies of the Link State, Adjacency, and Circuit databases.

In some embodiments there is also a location service (LS) controller operating external to the LSRP-related processes on the cards, wherein the LS controller configures and monitors the LSRP system. The LS controller may configure one of the three cards to execute the LSRP Update process, another to execute the LSRP Decision process, and the third to act as a backup, and may reassign roles according to monitored condition of the three cards.

In another aspect of the invention a distributed Link-State Routing Protocol (LSRP) system in a packet switch having external communication ports is provided, comprising a set of two or more cards in communication with one another and with the external communication ports, and a location service (LS) controller separate from but in communication with the cards. In this system the LS controller monitors and configures the cards, assigning LSRP functions and backup functions to individual cards.

In some embodiments of the system the LS controller reassigns functions to cards in the system in response to failures of cards in the system, providing fault tolerance.

In still another aspect of the invention a method for distributing a Link-State Routing Protocol in a packet switch having more than a single card is provided, comprising the steps of (a) configuring a first card to execute update process of the protocol; (b) configuring a second card to execute Decision process(Shortest-Path First (SPF)) of the protocol; and (c) executing the configured functions on the cards, and synchronizing copies of a the Adjacency, Circuit, and Link State databases on the cards.

In some embodiments of the method the LSRP is one of an Intermediate System to Intermediate System (IS—IS) LSRP or an Open Shortest Path First LSRP. There may further be a location service (LS) controller operating external to the card executing LSRP process, wherein the LS controller configures and monitors the LSRP system.

In some embodiments of the method there is at least a third card, wherein the LS controller configures one of the three to execute the LSRP Update process, another to execute the LSRP Decision(SPF) process, and the third to act as a backup, and reassigns roles according to monitored condition of the three cards. Two or more cards may be configured to execute the Update functions of the protocol.

In various embodiments of the invention described in enabling detail below, for the first time a scalable and fault tolerant Link State Routing Protocol is provided

BRIEF DESCRIPTION OF THE DRAWING FIGURES

FIG. 2 is a table showing possible states of a single control card running an IS—IS protocol.

DESCRIPTION OF THE PREFERRED EMBODIMENTS

As briefly described in the Background section above, the present inventors are engaged in development of new and improved packet switches (routers). In the present case, routers are under development having massive scalability and upwards of seven thousand I/O interfaces to other nodes in a packet network. With the development of higher capacity and scalability of capacity the importance of scalability of function and fault tolerance has grown apace.

One of the important functions of a packet switch in a network is to keep track of changes in network topology, meaning the existence of neighboring routers and connectivity, and the relative latency of alternate paths through the network to intermediate destinations. On a micro-scale, when a packet arrives at a packet switch, the switch needs to decide, and quickly, based upon destination information received with the packet for example, where to send the packet next. The decision is not a simple process, because, as hinted above, topology is constantly changing.

One widely-used and well-known type of routing protocol used for routing control is known generally as Link-State Routing Protocol (LSRP), of which two prime examples are Open Shortest Path First (OSPF) and Intermediate System to Intermediate System (IS—IS) protocol, used in the art in Internet Protocol (IP) and Open Systems Interconnect (OSI) based networks.

In the present document and disclosure the IS—IS protocol is used as a prime example, although it is to be understood that the invention is not limited to the IS—IS protocol but may be applied to other LSRPs such as OSPF.

Figure 1:
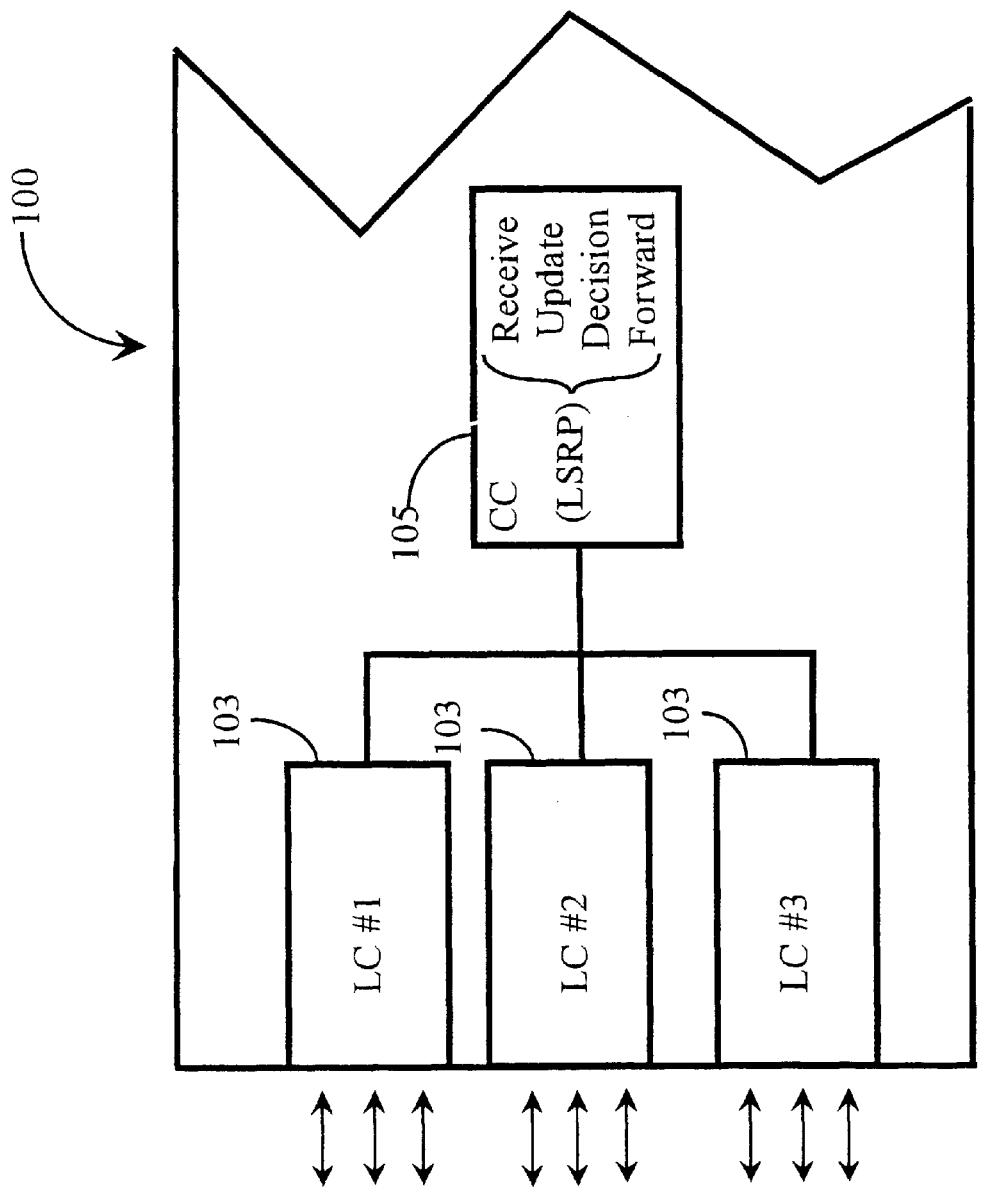
FIG. 1 is a diagram of a switch operating a Link State Routing Protocol in the prior art.

FIG. 1 is a simplified diagrammatical representation of a packet switching apparatus 100 in the prior art. Apparatus 100 may be referred to in the art as a packet switch or as a router. Apparatus 100 in this example has a plurality of line cards 103 and at least one control card 105 serving more than one line card. Each line card has a plurality of ports through which data is sent and received, indicated in FIG. 1 by bi-directional arrows. Control card 105 in this example is configured and enabled to perform a Link State Routing Protocol (LSRP), wherein the protocol maintains adjacencies with neighboring packet switches by means of advertisements, and builds a network topology database, which is also referred to as a Link State Database. In practice the LSRP calculates the shortest path between points in the network connected through ports of the line cards.

In current routers the processes of the routing protocol are all performed on one control card. A particular drawback in this prior art system is that the protocol is neither scalable nor fault tolerant.

As mentioned above, IS—IS protocol is used exemplary in this specification to illustrate the features and advantages of the present invention. IS—IS protocol is an Interior Gateway Protocol for routing packets between routers belonging to a single domain.

Since the size of a domain can be significantly large, especially in the case of large Internet Service Providers (ISPs), fault tolerance and scalability are critical requirements for a robust protocol implementation. In a preferred embodiment of the present invention fault tolerance requires at least two cards running IS—IS with one acting as a backup for the other In many embodiments there are plural active cards with functions of the protocol distributed among the active cards and at least one backup card ready to take over for any active card that might fail. The backup card in this embodiment has exactly the same configuration as the active card and maintains a copy of dynamic databases synchronized with the state of the databases on the active card. In the event of failure of the active card, this allows the backup to assume the active role without affecting the externally visible behavior of the router.

The databases utilized by the protocol are:
1) Link State Database—This is a description of the network topology.
2) Adjacency Database—This is a description of the neighboring equipment, such as routers, to which the local router is immediately connected.
3) Circuit Database—A description of the network layer circuits which are directly accessible by the local router.
4) Forwarding Database—The output of the decision process, this describes the neighbor to which PDUs addressed to particular destinations should be forwarded.

There are generally four processes in a Link State Routing Protocol (LSRP), whether in current art, or as used in embodiments of the present invention. The processes are:
1) The Decision Process The Decision process calculates routes to destinations—commonly known as the Shortest Path First (SPF) calculation. As the size of the network grows, the computational requirements of the algorithm grow as the square of the number of nodes (worst case). This makes this process potentially the most CPU-intensive process of the four processes described herein. As the size of a network grows, the Decision Process is allowed to take somewhat longer to complete, so long as the maximum completion time is bounded. (Note: The ISO 10589 standard specifies a maximum compute time of 5 seconds.)

The inputs for the decision process are: Link State Database and Adjacency Database. The Outputs are the Forwarding Database.
2) The Update Process This process constructs, processes incoming, and propagates Link State Protocol Data Units (PDUs) for database updates. This process also constructs, processes incoming, and transmits hello PDUs, which are data updates that announce the presence of nodes. The process also maintains the state of the adjacency, circuit, and link state databases. The real time demands on the Update Process are more restrictive than that on the Decision Process in that, as the network grows in size, the response times of the Update Process to the receipt of PDUs should remain constant.

The inputs for this process are: Received PDUs, which may be Link-State PDUs (LSPs), Sequence Number Packets (SNPs), which may be partial or complete, and Hello PDUs (Hellos). The outputs are Adjacency and Link State Databases.
3) The Receive Process This process is responsible for obtaining incoming PDUs from supported subnetworks and for distributing the PDUs to the appropriate processes (forwarding or update).
4) The Forwarding Process This process supports relaying PDUs to all potential destinations in the supported network.

In some preferred embodiments of the present invention only the Update and Decision processes are performed by software. The receive and forwarding processes may be performed by hardware.

Terminology

In the present specification the following terminology is used:

A card running the IS—IS Update process in the active role has state "Active".

A card running the IS—IS Update process in the backup role has state "Backup"

A card running the IS—IS Decision process in the active role has state "SPF".

There is, in a preferred embodiment, no card running the IS—IS Decision process in the backup role. The potential state combinations for a given single card may therefore be listed as in FIG. 2.

Preferred embodiments of this invention require that the state of the Link State, Adjacency, and Circuit databases be synchronized between cards with state Active and cards with state Backup and/or SPF. Synchronization of these databases allows a Backup card to assume the role of an Active card in the event of failure. Synchronization of the databases also allows the SPF card to utilize the correct inputs in a distributed environment.

Figure 3:
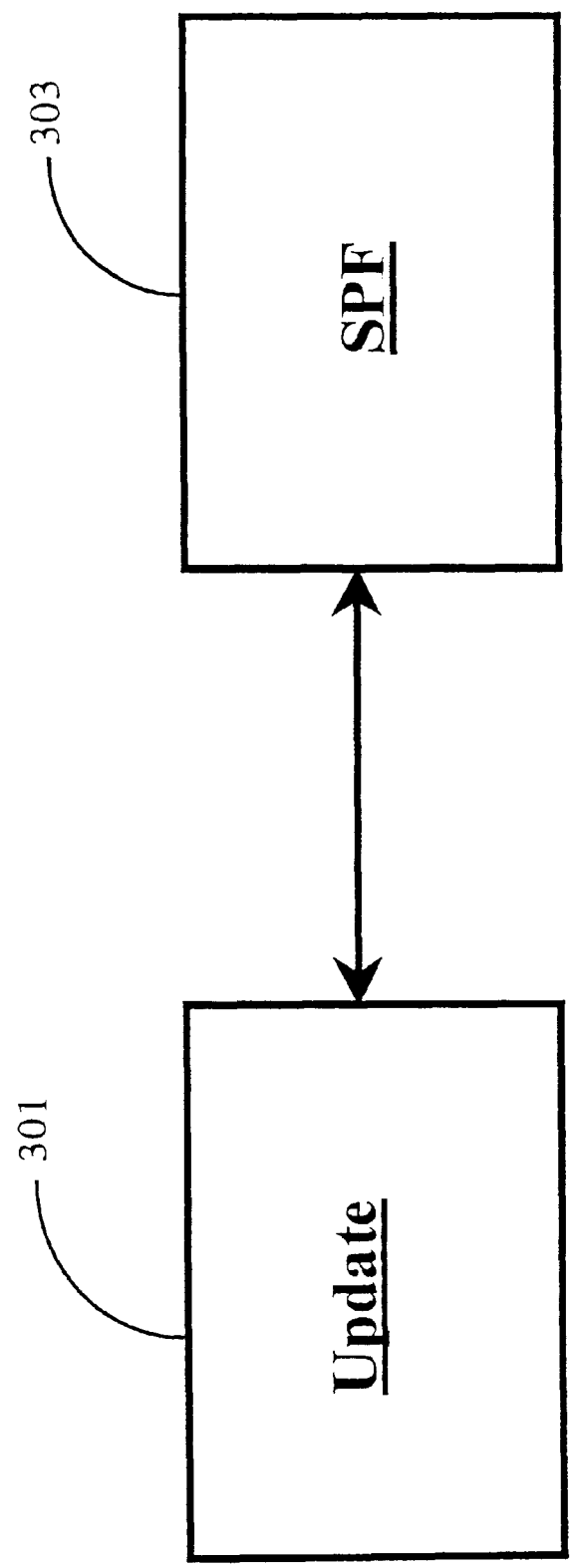
FIG. 3 is a block diagram of two control cards sharing functions of an IS—IS protocol according to an embodiment of the present invention.

FIG. 3 is a simplified block diagram of an IS—IS process in an embodiment of the present invention running on two active cards, these being cards 301 and 303. In this example the Update process is running on C 301 and the Decision (SPF) process is running on C 303. Distributing the functions of the IS—IS protocol allows for scalability in a scalable router.

Figure 4:
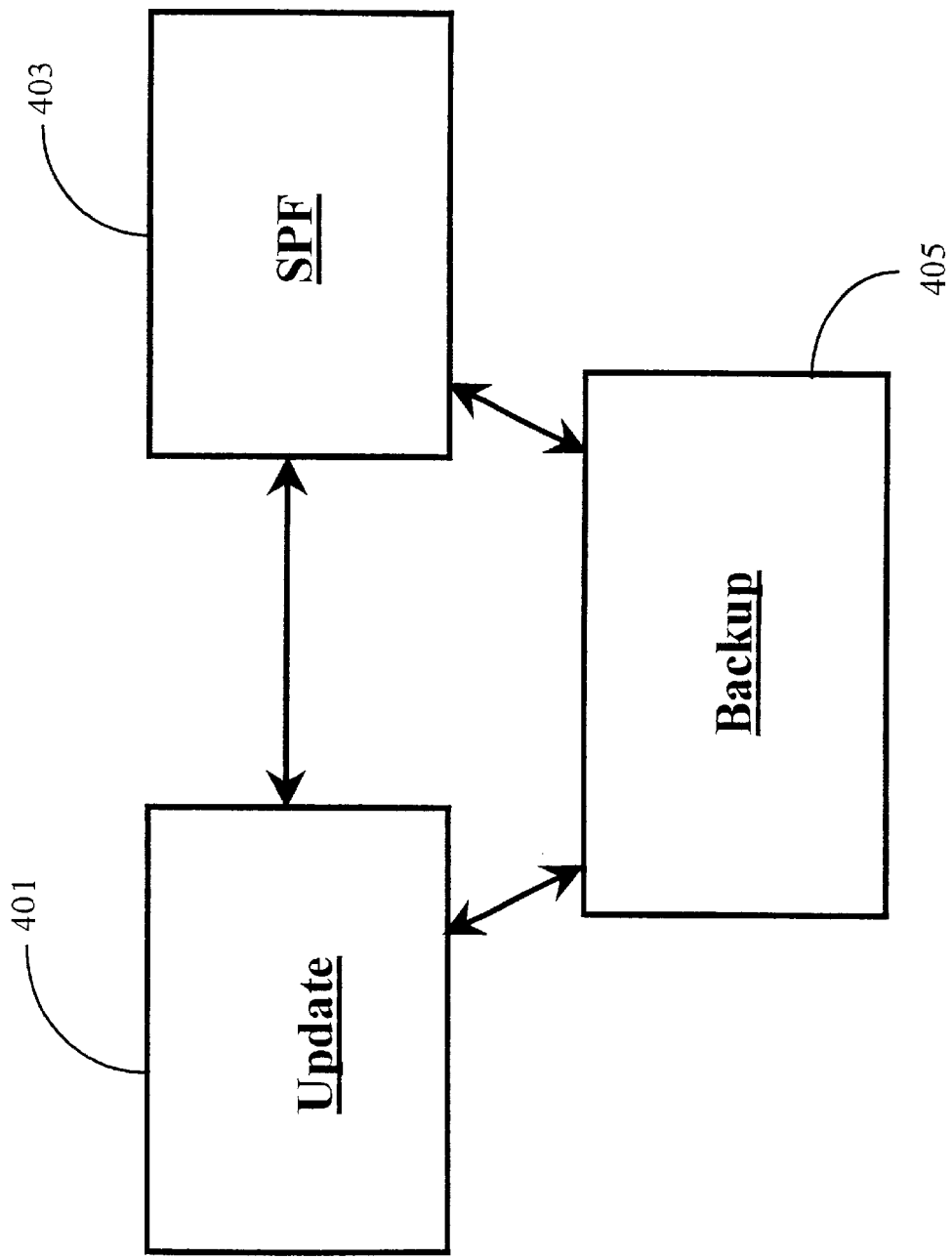
FIG. 4 is a block diagram of three control cards sharing functions of an IS—IS protocol in an embodiment of the invention, with one of the control cards serving a backup role

FIG. 4 is a simplified block diagram of an IS—IS process in an embodiment of the present invention, running on three cards, these being cards 401, 403 and 405. In this particular embodiment card 401 executes the Update process (ACTIVE), card 403 executes the Decision process (SPF), and card 405 is a redundant card acting as a BACKUP for either or both of cards 401 and 403. In FIG. 4 incoming protocol packets (PDUs) are processed by card 401, which performs updates, card 403 does SPF calculations, and card 401 synchronizes a copy of the databases in card 405, such that in the event that card 405 has to become active, it does so with an updated and current copy of all topology and path information.

Figure 5:
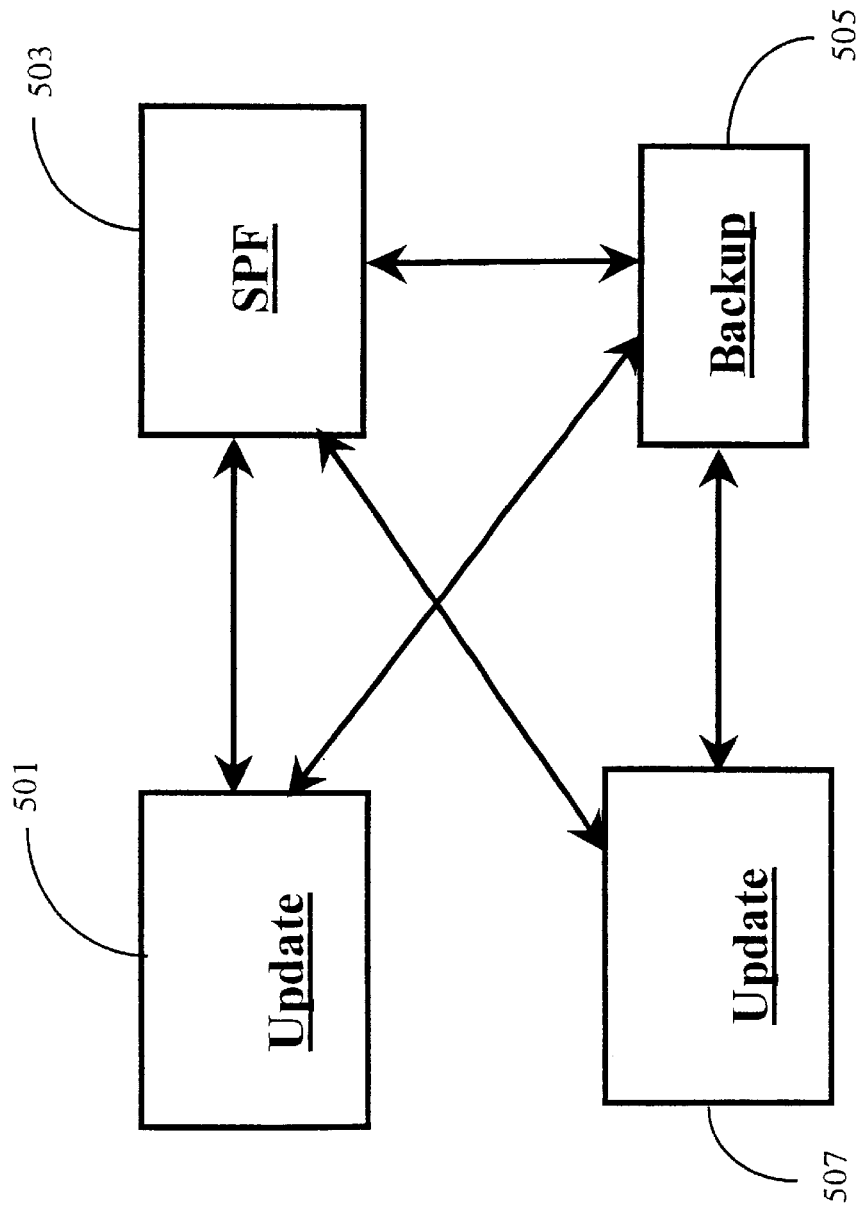
FIG. 5 is a block diagram of four control cards sharing functions of IS—IS protocol, with one card acting in a backup role.

FIG. 5 is a block diagram representing IS—IS protocol shared among four cards, these being cards 501, 503, 505, and 507. In this case the Update process is distributed on cards 501 and 507, and the Decision process is performed by one card (503). Card 505 acts as a backup for any of the three other cards.

FIGS. 3–5 illustrate in general, sharing and scalability of an IS—IS protocol on several cards of a packet switch apparatus in various embodiments of the present invention, and are meant to illustrate a few of many ways such sharing might be done. The skilled artisan will recognize that the distribution of functionality could be different than that shown in the specific examples, and that the communication paths between cards represent interconnectivity of cards through the fabric of a packet switching apparatus.

In various embodiments of the present invention the IS—IS protocol can run on one or more cards. If only one card is available in a particular piece of equipment then IS—IS runs in a uniprocessor mode.

In preferred embodiments of the invention distributed IS—IS with backup is provided for a scalable Terrabit Network Router (TNR) wherein additional cards and fabric may be added, and routing equipment may therefore be provided to almost any reasonable rate level. Scalability for such equipment requires response time for the novel IS—IS protocol implementation to remain stable under large load conditions. Achieving this scalability requires distribution of IS—IS protocol processing among multiple cards so that additional CPU resources can be applied in real time.

In preferred embodiments of the invention a system is provided for monitoring of performance of cards involved in distributed protocol processing and backup, and for switching available cards into and out of active states as required.

In preferred embodiments the use or non-use of multiple cards for an IS—IS instance within a TNR does not affect the externally-visible behavior of the router. Also, when multiple cards are being used to run IS—IS, the failure of a single card is operationally transparent to the external behavior of the router (fault tolerance). As the size of the network increases the performance of the protocol does not degrade, and the system is extensible to the use of 2-N cards where "N" is a number larger than 3.

In a preferred embodiment of the present invention, when multiple cards are available to execute IS—IS processes, one card performs the Decision Process (SPF state), one (or more) cards perform the Update Process in the active role (ACTIVE state), and one card performs the Update Process in the backup role (Backup state). In the case where only two cards are available, the SPF card also assumes the role of Backup. When multiple cards are performing the Update Process in the Active role, each card is responsible for a disjoint set of circuits.

For multiple cards to operate together in embodiments of the invention, it is necessary to synchronize the databases on all cards running IS—IS processes. The approach used in preferred embodiments is referred to as Database State Change Synchronization (DSCS) i.e. the backup database(s) are synchronized with the Active database when state changes occur. Synchronization of the databases is directed by the Active card, if only one is active, or active cards if the processes are distributed over several cards. In preferred embodiments the Active card(s) process incoming PDUs and notify the Backup and/or SPF cards of any resulting state changes in the IS—IS databases (adjacency, link state, and/or circuit) via a reliable inter-process communications path. This path is referred to herein as the Database State Change synchronization Link (DSCSLink). All exchanges over DSCSLink are acknowledged.

Failure of the Backup or SPF card to acknowledge the receipt of a DSCSLink message in a timely fashion results in the receiving processor being identified as having failed. The state transitions occur in the remaining IS—IS cards to assume the IS—IS role of the failed card. The Backup and/or SPF cards periodically issue queries as to the health of the Active card. Failure of the Active card to respond to this query in a timely fashion results in the Active card as being identified as having failed.

It will be apparent to the skilled artisan that there are many alterations that might be made in embodiments of the inventions described herein without departing from the spirit and scope of the invention. There are many other possible alterations, and the invention should accordingly be granted the scope of the claims that follow.

What is claimed is:

1. A distributed Link-State Routing Protocol (LSRP) system in a packet switch having external communication ports, comprising:

a first card for executing an Update process of the LSRP;

a second card for executing a Decision process or an Update process of the LSRP;

a third card for executing a Decision process or an Update process of the LSRP; and a communication fabric coupling the cards with each other and the external ports;

wherein the first card updates both the second and third cards, maintaining synchronized copies of the Link State, Adjacency, and Circuit databases.

2. The system of claim 1 wherein the LSRP is one of an Intermediate System to Intermediate System (IS—IS) LSRP, or an Open Shortest Path First (OSPF) LSRP.

3. The system of claim 1 further comprising a location service (LS) controller operating external to the LSRP-related processes on the three cards, wherein the LS controller configures and monitors the LSRP system.

4. The system of claim 3 wherein the LS controller configures one of the three cards to execute the LSRP Update process, another to execute the LSRP Decision process, and the third to act as a backup, and reassigns roles according to monitored condition of the three cards.

5. A distributed Link-State Routing Protocol (LSRP) system in a packet switch having external communication ports, comprising:
 a set of two or more cards in communication with one another and with the external communication ports; and
 a location service (LS) controller separate from but in communication with the cards;
 wherein the LS controller monitors and configures the cards, assigning LSRP functions and backup functions to individual cards.

6. The system of claim 5, wherein the LS controller reassigns functions to cards in the system in response to failures of cards in the system, providing fault tolerance.

7. A packet switch, comprising:
 a plurality of cards, some of which have one or more communication ports;
 a first card executing an Update process of a Link-State Routing Protocol LSRP, making database updates;
 a second card executing a Decision process of the LSRP;
 a third card for executing either the Update process or the Decision process; and
 a communication fabric coupling the cards;
 wherein the first card updates both the second and third cards, maintaining synchronized copies of a the Adjacency, Circuit, and Link-State databases.

8. The packet switch of claim 7 wherein the LSRP is one of an Intermediate System to Intermediate System (IS—IS) LSRP or an Open Shortest Path First (OSPF) LSRP.

9. The packet switch of claim 7 further comprising a location service (LS) controller operating external to the first, second and third cards, wherein the LS controller configures and monitors the LSRP system.

10. The packet switch of claim 9 wherein the LS controller configures one of the three cards to execute the LSRP Update process, another to execute the LSRP Decision process, and the third to act as a backup, and reassigns roles according to monitored condition of the three cards.

11. A packet switch, comprising a set of cards, some of which have external communication ports; and
 a location service (LS) controller separate from but in communication with the set of cards;
 wherein the LS controller monitors and configures the cards, assigning LSRP functions and backup functions to individual ones of the cards.

12. The packet switch of claim 5 wherein the LS controller reassigns LSRP processes to card in the system in response to failures of cards in the system, providing fault tolerance.

13. A method for distributing a Link-State Routing Protocol in a packet switch having a plurality of cards, comprising the steps of:
 (a) configuring a first card to execute an Update process of the protocol;
 (b) configuring a second card to execute a Decision process of the protocol;
 (c) configuring a third card to execute either the Update process or the Decision process; and
 (d) synchronizing copies of routing databases on the second and third cards from the first card, such that one of the second and third cards may operate in Decision mode, and the other serves as a backup against failure of the second card.

14. The method of claim 13 wherein the LSRP is one of an Intermediate System to Intermediate System (IS—IS) LSRP or an Open Shortest Path First LSRP.

15. The method of claim 13 further comprising a location service (LS) controller operating external to the card executing LSRP process, wherein the LS controller configures and monitors the LSRP system operating on the cards.

16. The method of claim 13 wherein two or more cards are configured to execute the Update functions of the protocol.

* * * * *